Aug. 14, 1945.  J. B. THORPE  2,382,351
EXTENSOMETER
Filed June 11, 1941
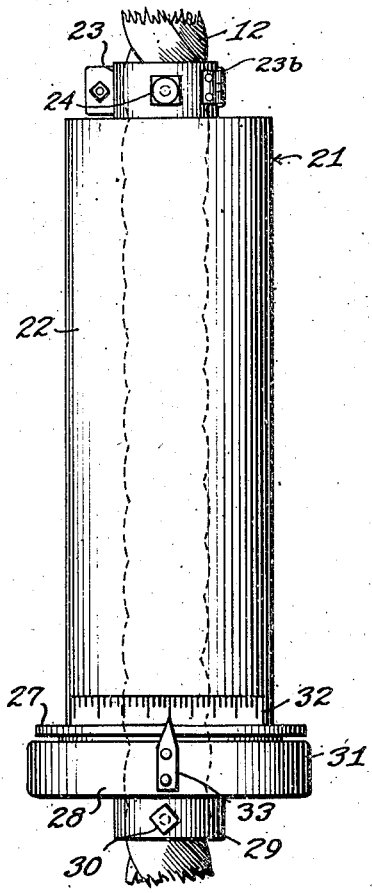
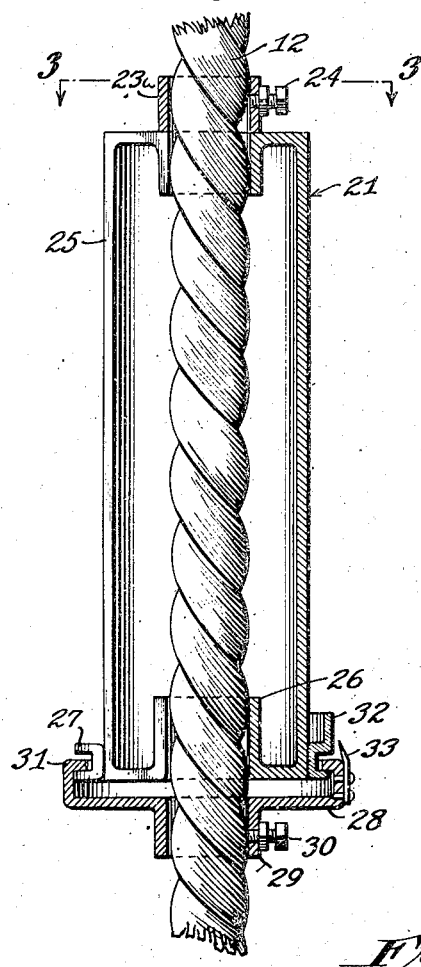
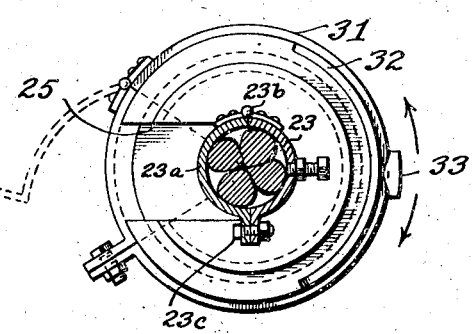
Inventor
JACK B. THORPE
By C. Lauren Maloly
Attorney Patented Aug. 14, 1945

2,382,351

UNITED STATES PATENT OFFICE 2,382,351

EXTENSOMETER

Jack B. Thorpe, Long Beach, Calif.

Application June 11, 1941, Serial No. 397,589

1 Claim. (Cl. 73—88)

This invention relates to measuring devices and more especially to an extensometer for measuring the load on a line or cable.

An object of the invention is to provide a simple, practical and efficient extensometer as described.

Another object is to provide an improved and simplified extensometer for determining the load on a line or cable adapted for direct reading while the line is being moved or reciprocated such as occurs in pumping operations.

Other objects and advantages will appear and be brought out more fully in the following specification, reference being had to the accompanying drawing, wherein:

Fig. 1 is an elevation view of the weight indicating instrument.

Fig. 2 is a sectional view of the same.

Fig. 3 is a sectional view taken along the line 3—3 of Fig. 2.

This invention relates to means for measuring the load on weighted lines or cables generally. In pumping operations, an important consideration is the efficiency of the pumping engine or motor, and the most efficient operation occurs only when the proper or optimum counter-balancing is maintained. It is therefore important to have available data which discloses any variation in the effective weight of the pump piston and connected rods and the material being pumped. A check or control of such data is attained by my invention which comprises the attachment to the cable connected to the pump rod of a device or instrument which translates from the condition of the cable the tension on the cable which includes the pump rod piston and the load.

I show an extensometer device 21 which comprises a tube 22 having a flange portion 23 provided with a cable opening and a set screw 24 for a firm attachment to cable 12, tube 22 having a side opening 25 to permit the insertion of the cable therein. Flange 23 has a portion 23a hinge connected at 23b to the flange and locked thereto by a bolt 23c to seat cable 12 when set screw 24 is turned down against cable 12. Tube 22 is provided with a cable guide flange 26 at the lower end, and a flanged ring 27. A plate member 28 having a side opening to admit cable 12 is provided with a cable flange 29 and clamping means 30 therefor similar to that on flange 23, and is further provided with an inturned flange 31 which has rotatable engagement in the flanged or channeled portion of ring 27. Ring 27 is provided with a flanged portion 32 which carries a scale, and plate 28 is provided with an indicating pointer 33 adapted to pass over the scale.

A twisted steel cable, such as shown at 12, when placed under tension, undergoes a twist, which, between two separated points such as flanges 23 and 29, can be registered by an instrument, and this twist for any particular cable will be proportional to the tension thereon, and the scale at 32 can be calibrated to read in pounds, representing the tension. Thus by my extensometer 21 the tension on cable 12 can be easily read from the scale indications and changed whenever the indicator indicates a change should be made, and the driving power such as a motor or engine can be operated at maximum efficiency.

It will be understood that the foregoing description is illustrative rather than restrictive of the invention, and changes and modifications may be made without departing from the spirit and scope of the subjoined claims. The extensometer is applicable to elevators, hoists, cranes, and any and all types of tensioned lines or cables.

Having described my invention, what I claim is:

An extensometer as described comprising a tubular member adapted to be secured at one end to a cable, and having a plate member in rotative engagement therewith at the other end, and adapted to be secured to said cable, and a pointer and scale on said tubular member and plate respectively, adapted to indicate the angular twist thereof between the said places of attachment.

JACK B. THORPE.